Patented May 7, 1935

2,000,383

UNITED STATES PATENT OFFICE 2,000,383

COMPOSITE ARTICLE AND PROCESS OF MAKING THE SAME

Harvey R. Fife, Pittsburgh, Pa., assignor to Carbide and Carbon Chemicals Corporation, a corporation of New York No Drawing. Application March 25, 1931, Serial No. 525,344

2 Claims (Cl. 154—2)

This invention pertains to composite articles and particularly to molded laminated or veneered articles which include polymerization products of vinyl compounds in their composition. These polymerization products will be hereinafter referred to as vinyl resins.

It has been proposed to make laminated articles and to apply veneering layers to various substances with a large variety of artificial and natural resins. In the general field of veneering, many objectionable features accruing from the use of these substances have arisen. For example, most natural resins are soluble in alcohol or gasoline; hence contact with these common solvents may seriously impair the veneered surface. Many synthetic resins, particularly those of the thermosetting type, are infusible and insoluble, and laminated or veneered articles in which these resins have been used are difficult to repair or resurface. All of the resins that have been previously proposed for this purpose are too brittle to permit of their transportation and use in the form of thin sheets, and none of the resins heretofore known will admit of laminating or veneering operations on unseasoned wood or wood of similar moisture content.

The principal object of my invention is to provide a novel process for making laminated and veneered composite articles by a molding process.

Another object is to provide a process and binder which will permit the laminating of unseasoned wood or wood of similar moisture content.

Another object is to produce laminated objects which are unaffected by ordinary conditions but which may be easily resurfaced and repaired. I further propose to provide a composite article which will have no tendency to warp.

I have found by experiment that I am enabled to achieve the objects of my invention by the use of vinyl resins in laminating and veneer work. These resins may be used to form composite articles which show little or no tendency to warp out of a true plane. By this fact alone an advantage is gained which was previously unattained in the art. Other advantages are also present in composite articles formed with vinyl resins. For example, a layer of veneer secured to a surface with a vinyl resin molded integrally therewith is unaffected by all common liquids, such as water, alcohol, gasoline, and the like, but if it is desired to remove a portion of the veneer for the purpose of repair, it may be loosened by the action of a solvent for the resin, such as ethyl acetate, acetone, glycol ethers and the like. Also, the veneer may be loosened by heating the article to a temperature above 100° C. and it may be removed while so heated. Vinyl resins may be used for veneering and laminating purposes in sheet form. The elasticity and flexibility of these resins is sufficient to permit of their application and distribution in the form of thin sheets. The advantages and economy of this property are apparent. Furthermore, unlike the thermo-hardening resins, vinyl resins may be reapplied. They do not lose their usefulness after heating. This quality avoids waste and increases economy.

Another advantage of my invention is the fact that by its use certain woods may be used for their decorative value as veneers that have never been so utilized previously. For example, sumac, which has an excellent grain, but which is very soft and which dries so rapidly that seasoned lumber suitable for veneer cannot be prepared therefrom, may be laminated before seasoning, or if a moisture content comparable to that of unseasoned wood is supplied to the wood, with vinyl resins and thereafter cured, sanded and worked without difficulty.

By means of my invention fibre board, cork board or coarse wood may be veneered to give the appearance of fine wood. The vinyl resin penetrates the veneering layer and the base and a true molded composite is the result. Finishing operations on the wood may then proceed in the usual way. The portions to be bonded may be joined by treating them with a solution of a vinyl resin, removing the solvent by drying, and pressing the surfaces together between hot plates. The pressing temperature should be sufficiently high to permit the vinyl resin to flow readily, for example, about 100° C. to 150° C. The resin may be applied as a sheet or powder to the surfaces to be joined and the pieces are then joined by heat and pressure as before. It is usually advisable to cool the composite article under some pressure.

The following example illustrates my invention:

A piece of fibre board and a sheet of veneer of equal area were each coated on one side with a 20% solution of vinyl acetate resin in acetone. The sheets were then dried until the solvent was entirely removed, and clamped together in a press and hot-pressed at 100° C. and 25 pounds per square inch of pressure until sufficient penetration of the sheets by the resin had occurred. The product was then cooled under some pressure and unclamped. The vinyl resin penetrated the veneer and a firmly molded veneered sheet resulted. The surface was then scraped, sanded and finished in the usual way. The vinyl resin acts as a filler for the pervious veneering sheet and the composite article is entirely unaffected by atmospheric changes or influences.

The invention is not limited to any particular type of vinyl resin, and the pressure and molding time and temperature will vary with the type of resin and materials used. The resin may be applied as a sheet or powder instead of a solution. The vinyl resin is not to be considered as a glue substitute, nor are the composite articles produced identical with glued composites. The product is a true molded article in which the vinyl resin penetrates the surfaces joined, the vinyl resin forming an integral structure throughout the laminations.

I claim:

1. A process for making composite articles from a plurality of laminae of wood having a greater moisture content than seasoned wood, which comprises applying a vinyl resin to adjacent faces of said laminae, assembling the laminae, subjecting the assembly to sufficient heat and pressure to cause the vinyl resin to flow and cooling the assembly under pressure.

2. A composite article comprising a plurality of laminae of wood, at least one lamina of which is of wood having a greater moisture content than seasoned wood, and the whole being united by a vinyl resin composition molded integrally throughout the laminae.

HARVEY R. FIFE.